United States Patent [19]
Cutshall et al.

[11] Patent Number: 6,073,226
[45] Date of Patent: Jun. 6, 2000

[54] SYSTEM AND METHOD FOR MINIMIZING PAGE TABLES IN VIRTUAL MEMORY SYSTEMS

[75] Inventors: Scott Cutshall, Carnation; Brian Smith, Seattle, both of Wash.

[73] Assignee: Microsoft Corporation, Redmond, Wash.

[21] Appl. No.: 08/820,155

[22] Filed: Mar. 19, 1997

[51] Int. Cl.⁷ .................................................... G06F 9/26
[52] U.S. Cl. .......................... 711/203; 711/202; 711/206; 711/221
[58] Field of Search .................................. 711/202, 203, 711/205, 206, 207, 221

[56] References Cited

U.S. PATENT DOCUMENTS

| | | | |
|---|---|---|---|
| 5,630,087 | 5/1997 | Talluri et al. | 711/202 |
| 5,668,968 | 9/1997 | Wu | 711/3 |
| 5,696,927 | 12/1997 | MacDonald et al. | 711/207 |
| 5,724,538 | 3/1998 | Morris et al. | 711/206 |
| 5,752,275 | 5/1998 | Hammond | 711/207 |

*Primary Examiner*—John W. Cabeca
*Assistant Examiner*—Fred F. Tzeng
*Attorney, Agent, or Firm*—Lee & Hayes, PLLC

[57] ABSTRACT

The invention described herein works in conjunction with a processor having an address translation cache that is updated by referencing a page table directory and a plurality of associated page tables referenced by the page table directory. The page table directory and a single page table are configured to generate a memory fault whenever the processor attempts to update its address translation cache. In response to such a memory fault, a memory fault handler temporarily loads a single page table entry with the needed address translation. In addition, the memory fault handler initializes the page table directory so that it references the single page table entry that has been loaded. Control is then returned from the memory fault handler, and the processor obtains the address translation. In response to a subsequent memory fault, the memory fault handler invalidates the previously loaded entry, and loads whatever address translation is currently needed by the processor. The address translations are cached in the processor's translation lookaside buffer.

30 Claims, 8 Drawing Sheets

| | | |
|---|---|---|
| LINE A | TAG 1 | PPA1 |
| LINE B | TAG 2 | PPA2 |
| LINE C | TAG 3 | PPA3 |
| LINE D | TAG 4 | PPA4 |
| LINE E | TAG 5 | PPA5 |
| LINE F | TAG 6 | PPA6 |
| LINE G | TAG 7 | PPA7 |
| LINE H | TAG 8 | PPA8 |

LINE NUMBER

| | | | |
|---|---|---|---|
| LINE A | 0 | TAG 1 | PPA1 |
| LINE B | 1 | TAG 2 | PPA2 |
| LINE C | 2 | TAG 3 | PPA3 |
| LINE D | 3 | TAG 4 | PPA4 |
| LINE E | 4 | TAG 5 | PPA5 |
| LINE F | 5 | TAG 6 | PPA6 |
| LINE G | 6 | TAG 7 | PPA7 |
| LINE H | 7 | TAG 8 | PPA8 |

| LINE NUMBER | | | | | |
|---|---|---|---|---|---|
| LINE A | 0 | TAG 1 | PPA1 | TAG2 | PPA2 |
| LINE B | 1 | TAG3 | PPA3 | TAG4 | PPA4 |
| LINE C | 2 | TAG5 | PPA5 | TAG6 | PPA6 |
| LINE D | 3 | TAG7 | PPA7 | TAG8 | PPA8 |
| LINE E | 4 | TAG9 | PPA9 | TAG10 | PPA10 |
| LINE F | 5 | TAG11 | PPA11 | TAG12 | PPA12 |
| LINE G | 6 | TAG13 | PPA13 | TAG14 | PPA14 |
| LINE H | 7 | TAG15 | PPA15 | TAG16 | PPA16 |

*Fig. 4 Prior Art*

SYSTEM AND METHOD FOR MINIMIZING PAGE TABLES IN VIRTUAL MEMORY SYSTEMS

TECHNICAL FIELD

This invention relates to methods for eliminating requirements of multiple page tables in systems having processors that are configured to normally use such multiple page tables.

BACKGROUND OF THE INVENTION

Many modern computer systems run multiple concurrent tasks or processes, each with its own address space. It would be expensive to dedicate a full complement of memory to each task, especially since many processes use only a small part of their address spaces. Rather, virtual memory is used to give each process the appearance of a full address space. This allows a program to run on what appears to be a large, contiguous, physical-memory address space, dedicated entirely to the program. In reality, however, the available physical memory in a virtual memory system is shared between multiple programs or processes. The memory that appears to be large and contiguous is actually smaller and fragmented between multiple programs. Virtual addresses used in a process are translated by a combination of computer hardware and software to addresses of physical memory. This process is called memory mapping or address translation.

Rather than attempting to maintain a translation or mapping for each possible virtual address, virtual memory systems divide virtual and physical memory into blocks. In many systems, these blocks are fixed in size and referred to as sections or pages. The addresses within an individual page all have identical upper-most bits. Thus, a memory address is the concatenation of a page number, corresponding to the upper bits of the address, and a page offset, corresponding to the lower bits of the address.

Data structures are typically maintained in physical memory to translate from virtual page numbers to physical page addresses. These data structures often take the form of conversion tables, normally referred to as page tables. A page table is indexed by a virtual page address or number, and generally has a number of entries corresponding to pages in the virtual address space. Each entry is a mapping of a specific page number or virtual page address to a physical page address.

Virtual-to-physical address translation can consume significant overhead, since every data access requires first accessing a page table to obtain a physical address and then accessing the data itself. To reduce address translation time, computers use a specialized hardware cache dedicated to translations. The cache is referred to as an address translation cache or as a translation lookaside buffer (TLB). A TLB is a fast and small static memory for storing the most frequently referenced entries from the page table. It typically has a fixed number of entries. When processing a memory request, a computer first attempts to find an appropriate address translation in the TLB. If such an address translation is not found, a page table is automatically accessed to retrieve the proper translation. The structure of the page table is predefined for use with a particular type of computer or microprocessor.

FIG. 1 shows a prior art example of a virtual memory system using a TLB and a page table. Each virtual address 12 of a process comprises a virtual page number and a page offset. The page number portion of the virtual address is used to index a TLB 14. Assuming that the TLB contains an entry corresponding to the virtual page number (a situation referred to as a TLB "hit"), the TLB produces a physical page address. The page offset portion of virtual address 12 is concatenated with the physical page address from the TLB, resulting in a full physical address for accessing physical memory 16. If the correct entry is not present in TLB 14 (a situation referred to as a TLB "miss"), an initial reference is made to page tables 18 (residing in physical memory 16) to update TLB 14.

There are two general types of TLBs: fully associative and set associative. If a translation entry can be located anywhere within the translation lookaside buffer, the TLB is said to be fully associative. In order to find the proper translation entry within a fully associative translation lookaside buffer, the computer must examine each and every translation entry. A set associative translation lookaside buffer, on the other hand, uses an indexing function so that any given address translation can be located only in a restricted set of places in the buffer. This reduces the number of translation entries which must be examined by the computer during each memory access.

FIG. 2 illustrates a fully associative TLB 30 having eight lines labeled A through H. Each line contains a single translation entry, comprising an address tag and a corresponding physical page address (PPA). In this example, each tag comprises a page number. Each line contains other information, not shown, such as reference and dirty bits. Translation entries are stored randomly within the lines of TLB 30. To find the correct translation entry, assuming it is present in the TLB, a computer must compare the tag value of each entry with the specified virtual address or page number. This generally requires a hardware comparator associated with each buffer line.

FIG. 3 shows a one-way set associative TLB 32, also having eight lines labeled A through H. A one-way set associative TLB is also referred to as a direct-mapped translation lookaside buffer. Each line again contains a single translation entry, comprising an address tag and a corresponding physical page address. However, the lines are uniquely addressable by a 3-bit line number, ranging from zero to seven. In one-way set associative TLB 32, any individual translation entry, corresponding to a specific page frame number, can be stored only at a single location which is specifically indexed by the 3-bit line number. To determine the line number corresponding to any specific page number, a buffer index is calculated according to the following equation:

$$\text{INDEX} = \text{PN modulo LNS}$$

where INDEX is the buffer index, PN is the specified page number, and LNS is the number of lines in the translation lookaside buffer, in this case 8. In this case, the equation given above results in the lower three bits of the page number being used as a buffer index, and as a map to the proper location in TLB 32 in which the corresponding translation entry should be stored. In performing a translation, the computer references only the TLB line having a line number which matches the buffer index. This scheme increases hardware efficiency, since only a single comparison is required.

Each line of one-way set associative TLB 32 includes a tag and a physical memory address, similar to the fully associative TLB described above. However, in this case the tag does not need to include the lower three bits which are used to form the buffer index. The computer compares the specified page frame number (excluding the lower three bits) with the stored page frame number (excluding the lower three bits). If the numbers match, there is a hit and the computer translates the specified virtual address using the stored physical page address. Otherwise, the translation entry is replaced with the proper entry recovered from a page table.

FIG. 4 shows a two-way set associative TLB 34. It is identical to one-way set associative TLB 32 in concept and operation, except that each line has two translation entries. Once the correct line has been determined, using the indexing method described above, the computer must check the tags of two translation entries to determine whether one of them is correct. In general, translation lookaside buffers can be from one-way to n-way associative.

The general memory organization and addressing schemes discussed herein are described more fully in J. Hennessy & D. Patterson, *Computer Architecture: A Quantitative Approach* (1990), which is hereby incorporated by reference. Refer particularly to chapter 8, entitled "Memory-Hierarchy Design."

Different microprocessors implement their TLBs in different ways. The popular Pentium® Pro microprocessor (manufactured by Intel® corporation), for example, utilizes four TLBs: one for small (4K) data pages, one for large (2M and 4M) data pages, one for small (4K) code pages, and one for large (2M and 4M) code pages. These are each 4-way set associative caches that hold the most recently used address translations. As another example, the ARM 610microprocessor (manufactured by Advanced RISC Machines Ltd ) has a single, 32-entry fully-associative TLB, with entries that are replaced using a FIFO (first-in, first-out) algorithm.

Many modern microprocessors such as the Pentium® Pro and ARM 610microprocessors normally resolve virtual memory addresses by referencing a set or a plurality of page tables rather than a single page table. Specifically, a hierarchy of page tables is maintained for each separate virtual address space, normally corresponding to each process that is executing on the microprocessor. FIG. 5 illustrates such a hierarchy, generally designated by reference numeral 40. Hierarchy 40 includes a page table directory 41 and a plurality of page tables 42.

Page table directory 41 has a plurality of entries that are indexed by uppermost bits 43 of page number 44. Thus, each directory entry corresponds to a range of page numbers. Each directory entry has a "valid" bit 45 that indicates whether the entry has been properly initialized, and a field 46 that references one of page tables 42. Each valid directory entry references a different one of tables 42, and each page table therefore corresponds to a range of page numbers.

In response to a TLB miss, a microprocessor refers to page table directory 41 in order to determine which page table has the desired address translation. The page table is indexed using lowermost bits 47 of page number 44. Each entry in page table 42 contains a "valid/invalid" bit 48, indicating whether the entry has been properly initialized, and a translation entry 49 containing a single address translation.

In many systems, page table entries are initialized whenever corresponding memory is allocated. In other systems, page tables and directories are built or initialized in response to misses. In this context, a miss occurs whenever an unmarked valid/invalid bit is encountered in either a page table or a page table directory. Initially, all valid/invalid bits are unmarked, indicating that the corresponding entries have not been initialized or are invalid for some other reason. In response to a page table or directory miss, a memory fault handler is initiated. The fault handler finds the desired address translation and loads it in the appropriate page table entry. The corresponding valid/invalid bit 48 is marked. In addition, the appropriate page directory entry is initialized to reference the correct page table and the directory entry is marked as valid. Control is then returned to the processor, which attempts again to retrieve the desired address translation from a page table. This time, the attempt is successful because of the steps completed by the fault handler.

The TLB and page table schemes described above are useful and desirable in most situations. One disadvantage, however, is the large amount of memory required for page tables. In some situations, memory is at such a premium that performance would willingly be sacrificed, if possible, in order to avoid the memory requirements of multiple page tables.

In other situations, it is desirable to bypass page tables in order to emulate microprocessors that do not support or require hardware page tables. This also allows operating system code to be more portable between different microprocessors.

Avoiding page tables might also be desirable in order to implement a different or more flexible memory management architecture. That is, it might be desirable to use another type of data structure in place of page tables, such as a "victim" cache, a fully associative cache, software page tables, etc.

Finally, eliminating multiple page tables might allow for more in-depth performance analysis and testing than might otherwise be possible. For example, fine grain working set measurements are possible in a system that implements the invention. The invention will make it possible to determine the TLB miss rate in a microprocessor that otherwise would not allow such a measurement. As another example, bounds checking software can be implemented in conjunction with the page table schemes described herein. The invention could also be useful for emulating the memory system of one microprocessor on another processor.

While there are potential advantages of avoiding multiple page tables in microprocessor systems, there is no easy way to accomplish this in many such systems. Many processors are configured to use the particular table schemes described above, and there is no apparent way to disable their reliance on page directories and associated page tables.

SUMMARY OF THE INVENTION

To avoid having a full complement of page tables, a processor-based system in accordance with the invention is configured to use a single page table entry for a plurality of different address translations. Such a single page table entry is loaded in response to a memory fault, with whatever address translation is currently needed by the processor. The entry is invalidated after it has been referenced by the processor.

To be more specific, each entry of a page table directory is initialized to reference a single page table. In addition, each such entry is marked as invalid so that any attempt by the processor to update its TLB will generate a memory fault. In response to such a memory fault, a memory fault handler marks the appropriate directory entry as valid, and initializes a single page table entry with the needed address translation. The initialized page table entry is the one that will be referenced by the processor when it attempts to obtain the address translation.

Control is returned from the memory fault handler, and the processor obtains the address translation from the initialized page table entry. Subsequently, the validated directory entry and the initialized page table entry are both invalidated prior to initializing additional entries on subsequent faults.

Using this configuration, only a single page table and a single page table directory are needed—entries are re-used on a dynamic basis to fill the needs of the processor as it updates its TLB.

In some cases, it might be desirable to maintain a limited pool of page tables, and to allow a plurality of valid entries to be gradually placed in each page table. When a new page table is needed, one of the existing tables is cleared or invalidated and is used for the new page table, with appropriate updates being made in the page table directory.

BRIEF DESCRIPTION OF THE DRAWINGS

FIGS. 2–4 are block diagrams of prior art TLBs.

DETAILED DESCRIPTION OF THE PREFERRED EMBODIMENT

Figure 1:
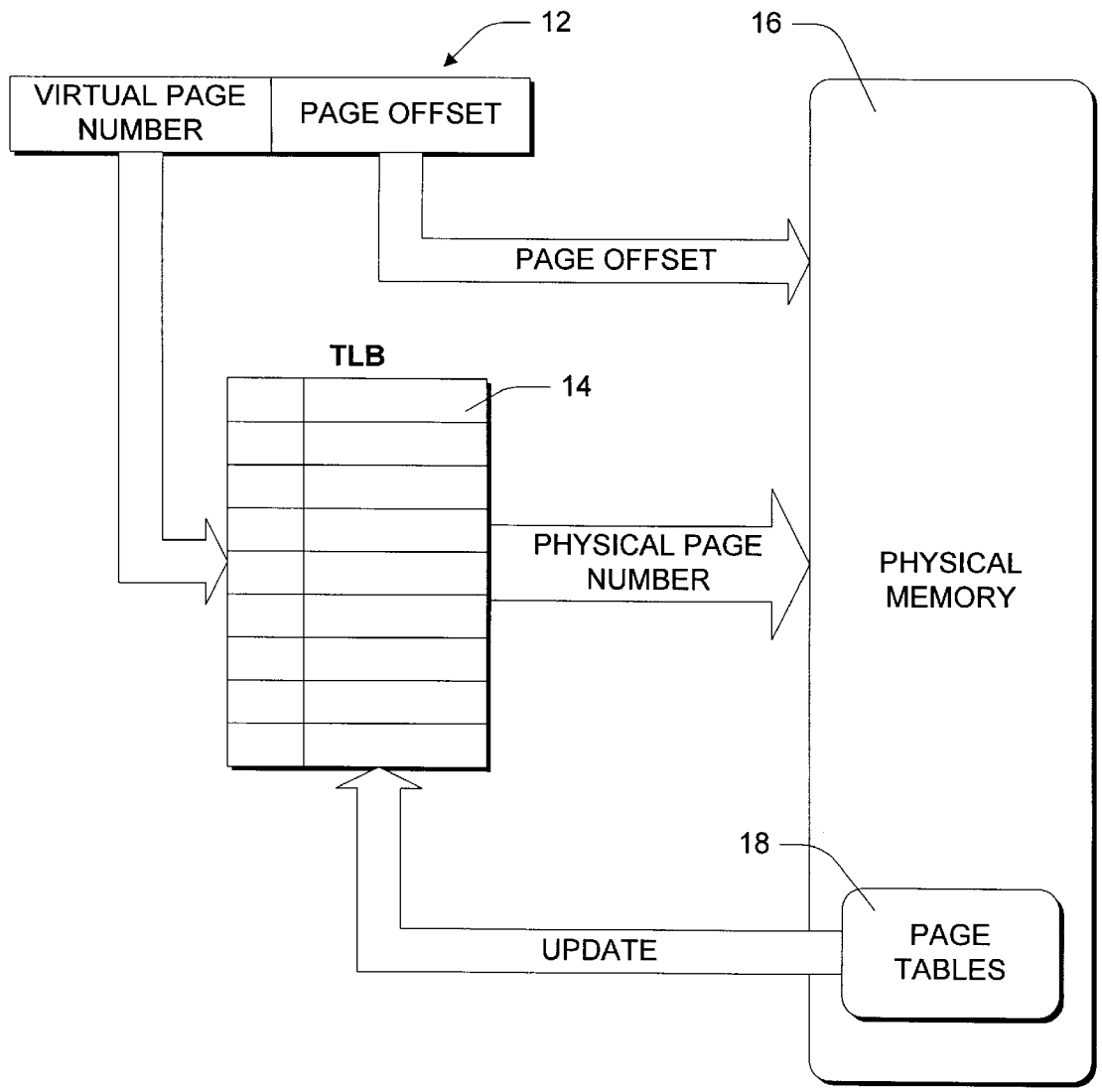
FIG. 1 is a block diagram of a prior art virtual memory system.
Figure 5:
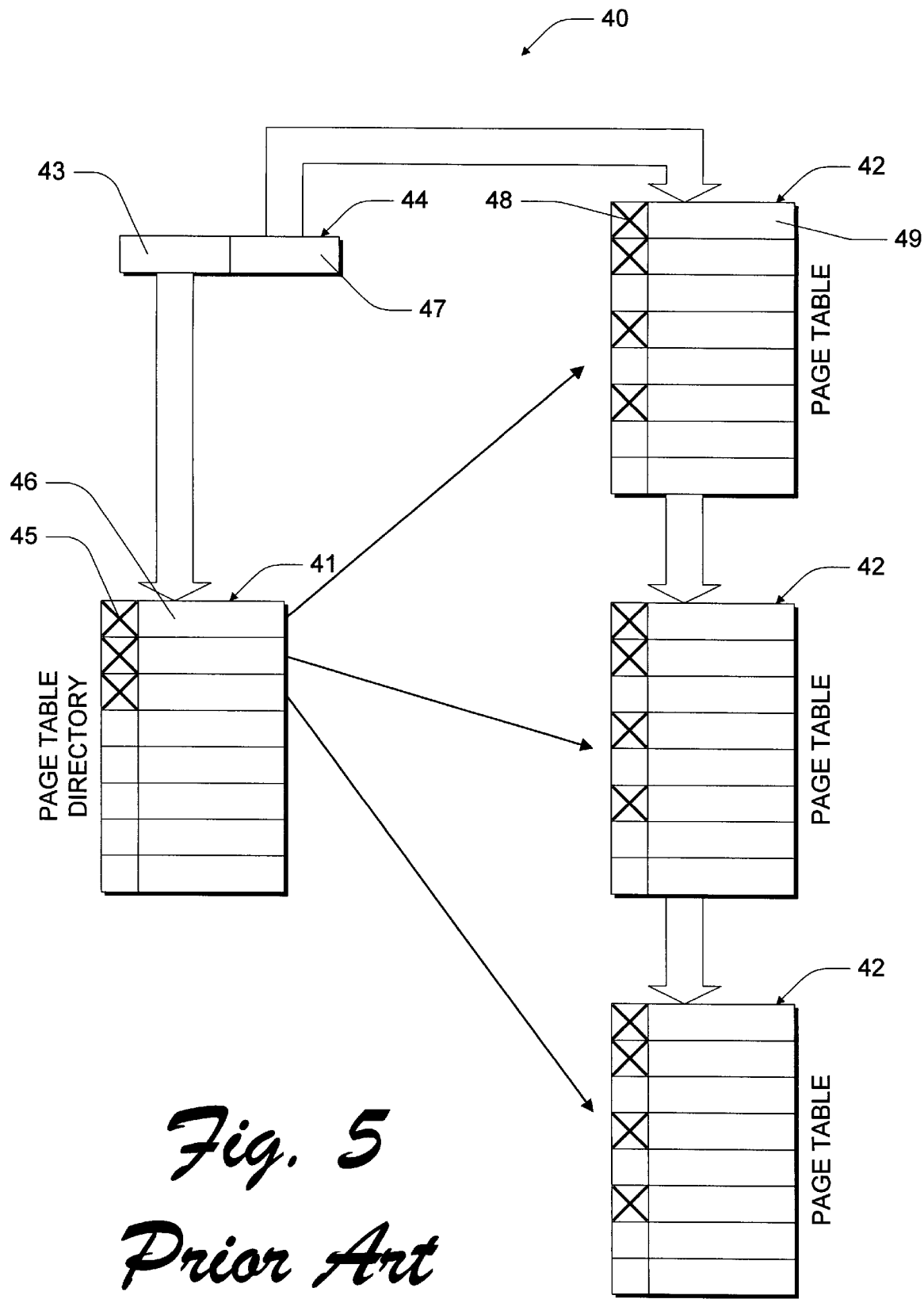
FIG. 5 is a block diagram illustrating the prior art use of a page directory and associated page tables.
Figure 6:
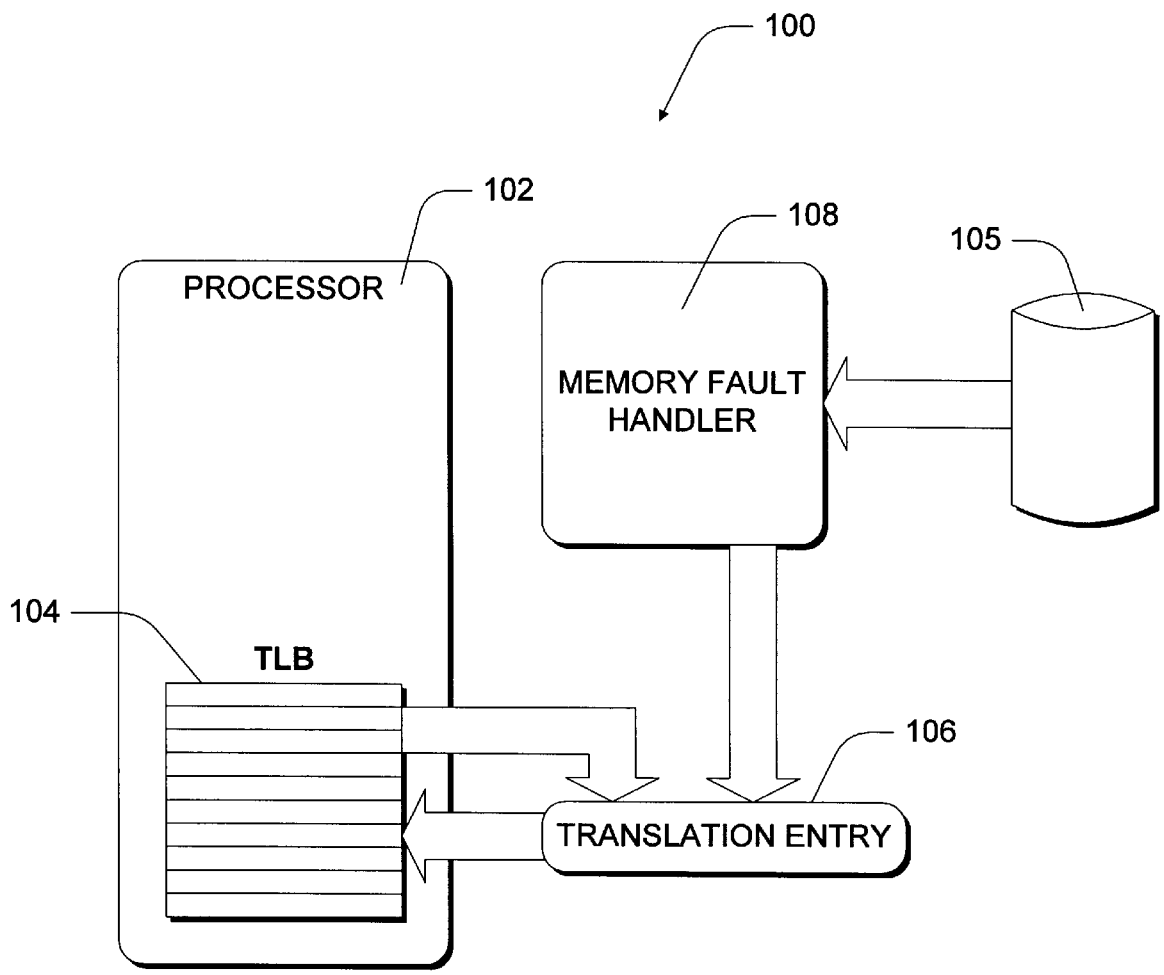
FIG. 6 is a block diagram showing one embodiment of the invention.

FIG. 6 illustrates an embodiment of the invention in general terms, showing a computer system 100 comprising a processor or microprocessor 102 having at least one internal address translation cache or TLB 104. As described above, the processor 102 resolves virtual memory addresses or virtual memory page numbers with reference to its internal TLB whenever possible. That is, address translations are obtained from the TLB when they are present in the TLB. Often, however, it is necessary to reference external tables to resolve virtual addresses or page numbers. Thus, the TLB is updated when necessary by automatically referencing table entries that normally each store a single address translation. The Pentium® Pro and ARM 610 microprocessors, described above, are examples of such processors that work in this way. Each of these processors normally uses a table hierarchy including a plurality of page tables.

Specifically, these processors update their TLBs by referencing a page table directory and a plurality of associated page tables referenced by the page table directory. Each page table entry normally stores a single address translation corresponding to a single virtual page address. In other words, there is normally a one-to-one correspondence between virtual page numbers or addresses and page table entries—the processors are configured to reference a specific page table entry to obtain a given address translation. To determine which page table entry contains the desired address translation, part of the virtual page address is used as an index to find a corresponding entry in the table directory. This table directory entry points the processor to a particular page table, and another part of the virtual page address is used as an index to find the page table entry corresponding to the virtual page address.

One requirement of processor 102 for use in conjunction with system 100 is that it have one or more associative TLBs that are large enough to store all the address translations required by the processor during execution of a single instruction. This requirement will be discussed in more detail below.

Computer system 100 includes at least a single page table entry, shown in FIG. 6 as an entry 106. Processor 102 is configured to reference the single page table entry to obtain a plurality of different address translations. This is in contrast to conventional practice, in which only a single address translation is available from any single page table entry.

Computer system 100 includes a memory fault handler 108, implemented in software and executed by processor 102, that has access to a database 105 containing a complete description of the system's virtual memory. Memory fault handler 108 is invoked by processor 102 in response to memory faults. Memory faults, in turn, are generated whenever the entry 106 does not contain the address translation that is being sought by the processor—whenever the entry is marked as invalid. When invoked, fault handler 108 temporarily loads the sought-for address translation in table entry 106. After the memory fault handler is finished and has loaded the address translation, the processor retrieves and uses the address translation from the table entry. Subsequently, after the processor has obtained the address translation, the memory fault handler marks table entry 106 as invalid—preferably in response to a second memory fault that occurs after the first memory fault.

Figure 7:
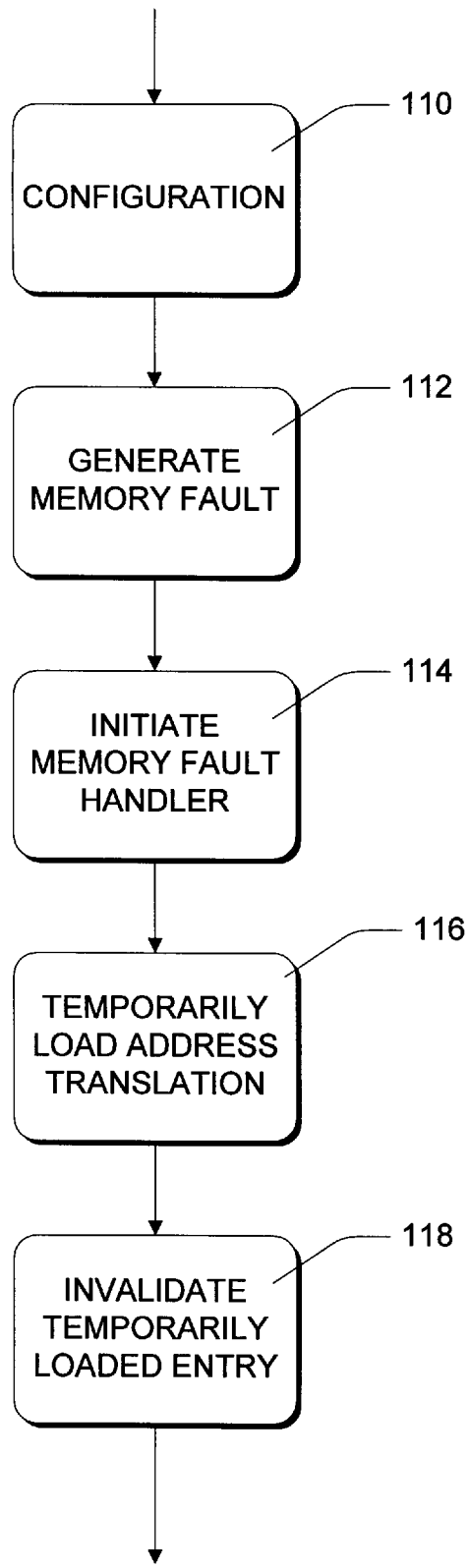
FIG. 7 is a flowchart showing methodological steps in accordance with the invention.

FIG. 7 shows the general methodological steps that are implemented in conjunction with processor 102. A preliminary step 110 comprises configuring processor 102 to reference a single table entry to obtain a plurality of different address translations. In practice, as will be explained in more detail below, this step involves initializing at least one and preferably multiple entries of a table directory to reference a single page table having a plurality of table entries. Thus, the processor is referred to a single page table or conversion table for resolving virtual memory addresses or page numbers that would normally be resolved by referencing different tables within a set of tables. The single page table is of a limited size, and the processor is referred to the same table entry for resolving a plurality of different page numbers or virtual memory addresses.

A step 112 comprises generating a first memory fault when the processor attempts to reference any of the single table entries of the page table. This step is accomplished by marking all of the table directory entries as invalid, and by marking all of the entries of the single page table as invalid. Because of this, the microprocessor generates a first memory fault whenever a particular address translation is needed by the processor to resolve a virtual memory address. In response to the memory fault, the processor initiates and executes a memory fault handler, as shown by step 114. The memory fault handler performs a step 116 of temporarily loading the needed address translation in the appropriate single table entry, and marking the entry and the associated directory entry as valid. Control is returned from the memory fault handler, and the processor obtains the address translation from the single table entry that has been temporarily loaded and marked as valid.

A step 118 comprises marking the temporarily loaded entry as invalid after the processor has obtained the address translation and resolved the referenced virtual memory address. In practice, this step is performed by the memory fault handler in response to a second, subsequent memory fault. The memory fault handler keeps track of which entry was loaded, and invalidates the table entry and its directory entry on the next memory fault.

These steps are repeated every time the processor attempts to obtain an address translation. Thus, instead of obtaining an address translation from a different table entry for each different page number, the processor refers to the same, single table entry for the address translations corresponding to a plurality of different page numbers. Each time the processor tries to obtain an address translation, the memory fault handler is invoked to put the right translation in the appropriate table entry, and to invalidate the previously loaded table entry.

Figure 8:
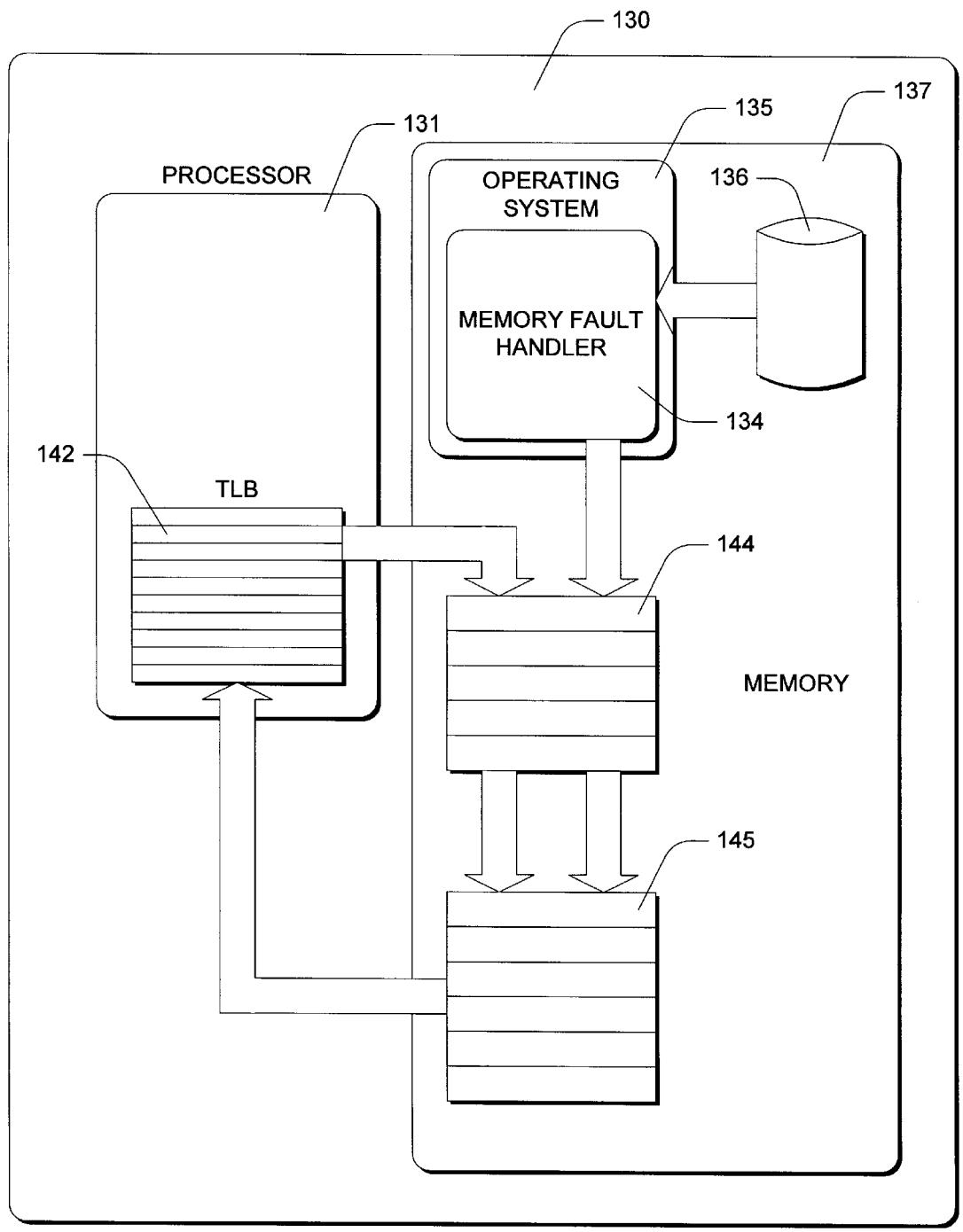
FIG. 8 is a block diagram showing a more detailed embodiment of the invention.

The invention is illustrated in more detail in FIG. 8. A computer system 130 includes processor 131 that is associated with a memory fault handler 134. Physical memory 137 is also associated with processor 131. Memory 137 is used for program and data storage. It includes electronic memory and other computer-readable storage media such as floppy disks, hard disks, CD-ROMs, etc. It might also include remote storage devices that are accessible via network connections Such as local area network or Internet connections.

The computer system includes an operating system 135 that implements a virtual memory system. Memory fault handler 134 is part of operating system 135. A complete description of the system's virtual address space is stored by the operating system in a database 136, and is referenced by the memory fault handler. The operating system and memory fault handler are stored in and execute from memory 137. Database 136 is similarly located within memory 137.

Again, processor 131 is of a type having at least one address translation cache or TLB 142. The processor is normally configured to work with a hierarchy of tables including one or more page directories and a plurality of page tables referenced by the page directories. Each page table entry normally stores a single address translation, corresponding to a single virtual page address or page number.

In this case, the computer system includes a single page table directory 144 and a single page table 145. In practice, a plurality of processes (not shown) execute from memory 137 at any given time, and there might be a table directory and a page table for every different process (although this is not required). Directory 144 and page table 145 are located in memory 137.

Page table directory 144 has a plurality of entries as described above in the "Background of the Invention" section. Each entry references a page table, and can be marked as either valid or invalid. In this case, each entry is initially marked invalid, to generate a memory fault whenever the processor attempts to update its address translation cache from the page table hierarchy.

Page table 145 also has a plurality of entries as described above, each having a valid/invalid bit and being capable of storing an address translation. Each entry is initially marked as invalid. The page table is preferably of the minimum size allowed by processor 131. In the case of a Pentium® microprocessor, the page table is 4 Kbytes. In the case of an ARM 610 microprocessor, the page table is 1 Kbyte. In both cases, the page table is too small to simultaneously store address translations for all possible virtual page addresses or page numbers. Rather, each entry is used on a dynamic basis to temporarily hold any one of a plurality of address translations, depending on the particular translation needed by the processor at any given time.

Specifically, any attempt by processor 131 to update its TLB from a page table results in a memory fault, due to each entry in the page directory and the single page table being marked as invalid. Memory fault handler 134 is initiated in response to each such memory fault.

Memory fault handler 134 responds to a memory fault by temporarily validating a single directory entry and a single table entry, corresponding to the entries that the processor is attempting to access to obtain a particular address translation corresponding to a particular virtual page address. To validate the directory entry, the memory fault handler initializes the directory entry to reference the single page table and marks the valid/invalid bit of the entry to indicate that the entry is now valid. The memory fault handler also refers to database 136 to find the address translation needed by processor 131. The memory fault handler loads this translation in the appropriate table entry, and marks the entry as valid. The memory fault handler then records its actions so that the directory and table entries can be invalidated after they are accessed by processor 131. Control is then returned from the memory fault handler. After the processor obtains the needed address translation, the memory fault handler marks the directory and table entries as again being invalid. This step of invalidating the entries is preferably performed when the memory fault handler is invoked in response to the next memory fault.

Using this configuration, only a single page table entry is valid at any given time. Another result is that any given page table entry might contain different address translations at different times. Specifically, a particular entry might contain a first address translation at one time, a second address translation at another time, and a third address translation at a third time.

There is a potential problem with the lookup scheme as described thus far, relating to the capacity of the processor's TLB to simultaneously store all the address translations needed for executing a particular processor instruction. Specifically, any particular processor instruction might require a plurality of address translations. To execute a single instruction, the processor must be able to obtain each of these address translations without a memory fault—without invoking the memory fault handler. Thus, when using the scheme described above, the processor's TLB or TLBs must have enough capacity to simultaneously cache all the address translations required for a single processor instruction. In addition, the memory fault handler and other operating system components must be configured so that they do not displace such address translations from the TLB or TLBs during execution of the instruction. If these requirements are met, an instruction simply generates memory faults until all the required translations are present in the TLB. Once this happens, the instruction can then execute through completion without further memory faults.

The ARM 610 microprocessor, having a 32-entry fully-associative TLB, is indeed capable of simultaneously storing the maximum number of address translations encountered by any single instruction. Thus, the only special measure needed to implement the above page table scheme in conjunction with this processor is to limit the number of different pages used by the memory fault handler (since each page potentially displaces an entry from the TLB). This is not difficult, since the ARM 610 supports "sections." A section in the ARM 610 processor is similar to a virtual memory page, except that it is 1 Mbyte in size and its address translation can be found in the table directory (referred to as a first-level translation table in the ARM 610), without referring to a lower-level page table entry. Thus, the code and data of the memory fault handler is simply placed in a limited number of sections.

The Pentium® Pro processor presents a slightly more complex problem, since it uses 4-way set-associative TLBs. Such a TLB can be guaranteed to store only 4 different translations during execution of a single instruction. However, the Pentium® Pro uses four TLBs, as already discussed above. Generally, the way to avoid displacing needed TLB entries when using the Pentium® Pro processor is to configure application or user-mode programs to use different TLBs than operating system components (including the memory fault handler).

As it turns out, individual user-mode instruction in the Pentium® Pro require no more than six address translations—two of those are code addresses and the remaining four are data addresses. In accordance with the invention, user-mode code and data are limited to "small" code and data pages. Recalling that different TLBs are used in the Pentium® Pro for small code pages and small data pages, respectively, it is evident that the two code addresses will be cached in one TLB, while the four data addresses will be cached in another TLB.

To keep the memory fault handler from displacing these TLB entries, its code and data are located in "large" code and data pages, for which still different TLBs are used. Alternatively, the memory fault handler code can be placed in no more than two small code pages, since the worst-case user mode instruction only uses two code pages, and since the TLB corresponding to small code pages is 4-way set-associative.

There are certain system-related functions and instructions in the Pentium® Pro that implicitly access more than the two code pages and four data pages mentioned above. However, the additionally-accessed pages are all system-managed data structures such as the global descriptor table, the interrupt descriptor table, task state segment data, etc. These structures are all placed in large data pages so that they correspond to a different TLB than any structures accessed by a user-mode instruction, which are located in small code and data pages.

Figure 9:
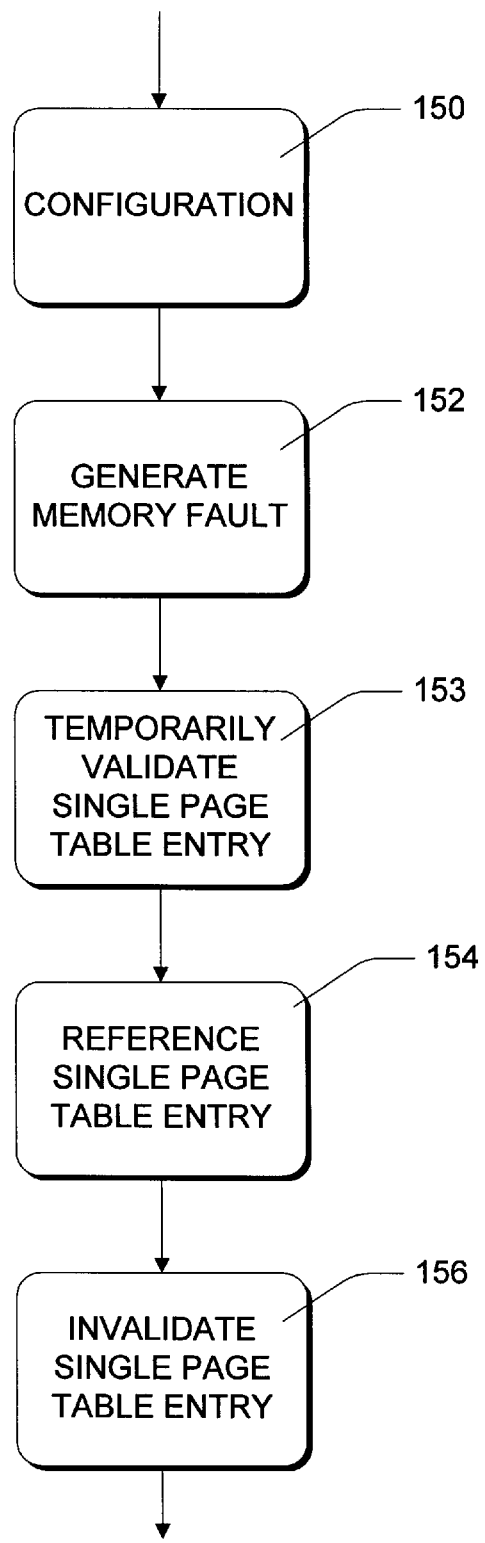
FIG. 9 is a flowchart showing further methodological steps in accordance with the invention.

Further methodological steps in accordance with the invention are described with reference to FIG. 9. Preferably, the system has an operating system program with program instructions that configure the processor to perform the steps. A configuration step 150 comprises configuring a page table directory and a single page or conversion table to generate a memory fault when the processor attempts to update its TLB. This is accomplished in the preferred embodiment by marking table directory entries and page table entries as invalid. Configuration step 150 further comprises configuring entries of the page table directory to reference the single page table. This has the effect of referring the processor to a single page table for resolving virtual memory addresses and for obtaining address translations, and to a single entry within the single page table for obtaining a plurality of different address translations. This is in contrast to conventional practice, in which different memory addresses are resolved by referencing different tables within a set of conversion tables. In accordance with the invention, any single entry within the single page table can contain different address translations at different times.

In response to the configuration step, the processor performs a step 152 of generating a first memory fault when attempting to obtain a particular address translation in response to a TLB miss.

The memory fault handler, invoked in response to the memory fault, performs a step 153 of temporarily validating the particular single page table entry that the processor is attempting to reference in order to obtain a particular address translation. This is done by marking an appropriate page table directory entry as valid, loading the address translation in the single page table entry, and then marking the single page table entry as valid.

The memory fault handler then relinquishes control, and the processor makes a successful attempt in a step 154 to reference the single page table entry that has just been validated, and to obtain the address translation that has been loaded therein.

A subsequent step 156 comprises invalidating the single page table entry. This step is performed after the processor has referenced the page table entry, preferably in response to a second memory fault subsequent to the first memory fault described above. In response to each memory fault, then, the memory fault handler invalidates the previously validated entry and in turn validates a new entry. Invalidating an entry involves marking both the table directory entry and the page table entry as invalid.

The validating and invalidating steps are repeated for all the address translations required to execute a single processor instruction, so that the address translations are simultaneously cached in one or more TLBs of the processor.

Special steps are taken on the Pentium Pro® processor to ensure that its TLBs can simultaneously cache all the address translations required for a single processor instruction in its multiple TLBs. In general, the processor and operating system are configured to use a first set of one or more TLBs for user or user-mode code and data addresses, and a second set of one or more TLBs for operating system or privileged-mode code and data addresses.

More specifically, different types of code and data are positioned in virtual memory pages to efficiently utilize the four TLBs of the Pentium® Pro processor. As discussed in general above, the Pentium® Pro processor has a first TLB for small code pages, a second TLB for large code pages, a third TLB for small data pages, and a fourth TLB for large data pages. Preferred steps in accordance with the invention including (a) positioning memory fault handler code in a large code page or in no more than two small code pages; (b) positioning memory fault handler data in one or more large data pages; (c) positioning system-managed data in one or more large data pages; and (d) positioning user code and data in small code and data pages, respectively.

Note that a system might opt to use this scheme only for a subset of the total page table entries. Specifically, on many systems it will be required, for various reasons, to use a conventional page table scheme for certain parts of the system address space. For instance, this might be required as a way for the memory fault handler to execute without displacing critical TLB entries.

One desirable characteristic of the invention is that it avoids flushing the processor's TLBs. In conventional practice, the TLBs are flushed whenever a table directory entry or a page table entry is invalidated. However, flushing a TLB is an expensive operation. The invention described herein avoids TLB flushing on page directory and page table entry invalidations. Rather, individual directory and table entries are invalidated on a routine basis without flushing any processor TLBs. Only when an address translation that is in the TLB needs to be modified or destroyed does the TLB need to be flushed.

Rather than restricting the number of valid page table entries to one, it is also possible to maintain a small pool of page tables, each with a list of valid entries. Only when a memory fault occurs that requires a new page table is it necessary to select an appropriate "in-use" page table and clear or invalidate all of its valid entries before initializing the entry for the current memory fault. If the running programs exhibit a high degree of locality of reference by concentrating their references in small regions of address space, then it is possible that a small number of page tables can be an efficient alternative to using a single page table entry.

Further steps in accordance with the invention thus include maintaining a limited pool of page tables, and initializing entries of the page tables in response to memory faults. In response to a particular memory fault generated when the processor attempts to obtain a new address translation requiring a page table that is not part of the limited pool of page tables, the memory fault handler clears a selected one of the pool of page tables and loads the new address translation in that selected page table. The memory fault handler also updates the page table directory to reference the selected one of the page tables for the new address translation.

The page table schemes described herein minimize the use of page tables, thus greatly reducing memory requirements in comparison to systems that use a full complement of page tables. The invention is also useful to emulate microprocessor systems that do not support or require hardware page tables. This has the further advantage of improving program code portability. Furthermore, eliminating or reducing the use of page tables allows a more flexible memory management to be implemented in place of the page table system, while providing for in-depth performance and testing.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. In conjunction with a processor that is configured to obtain virtual memory address translations by referencing table entries that normally each store a single address translation, a method comprising the following steps:

configuring the processor to reference a single table entry to obtain a plurality of different address translations;

generating a first memory fault when the processor attempts to reference said single table entry;

temporarily loading a particular address translation in said single table entry in response to said first memory fault, wherein the processor obtains said particular address translation from said single table entry after said first memory fault;

marking as invalid said single table entry after the processor has obtained said address translation;

the processor having an address translation cache, wherein the marking step is performed without flushing the address translation cache.

2. In conjunction with a processor that is configured to obtain virtual memory address translations by referencing table entries that normally each store a single address translation, a method comprising the following steps:

configuring the processor to reference a single table entry to obtain a plurality of different address translations;

generating a first memory fault when the processor attempts to reference said single table entry;

temporarily loading a particular address translation in said single table entry in response to said first memory fault, wherein the processor obtains said particular address translation from said single table entry after said first memory fault;

marking as invalid said single table entry after the processor has obtained said address translation;

generating a second memory fault after generating the first memory fault, wherein the marking step is performed in response to the second memory fault.

3. In conjunction with a processor that is configured to obtain virtual memory address translations by referencing table entries that normally each store a single address translation, a method comprising the following steps:

configuring the processor to reference a single table entry to obtain a plurality of different address translations;

generating a first memory fault when the processor attempts to reference said single table entry;

temporarily loading a particular address translation in said single table entry in response to said first memory fault, wherein the processor obtains said particular address translation from said single table entry after said first memory fault;

marking as invalid said single table entry after the processor has obtained said address translation;

wherein the configuring step comprises initializing multiple entries of a table directory to reference a single table that contains a plurality of entries including said single table entry.

4. In conjunction with a processor that normally resolves virtual memory page addresses by referencing a set of page tables, each page table having a plurality of page entries, wherein each page table entry is normally used for resolving a single virtual memory page address, a method comprising the following steps:

referring the processor to a single page table for resolving virtual memory page addresses, wherein the processor uses each page entry for resolving a plurality of different virtual memory page addresses;

when a particular address translation is needed by the processor to resolve a virtual memory page address, temporarily loading said particular address translation in a corresponding page entry in the single page table;

loading said entry with said particular address translation in response to a memory fault generated by the processor;

invalidating said entry in response to a subsequent memory fault generated by the processor.

5. A computer-readable storage medium having instructions for configuring the processor to perform the steps of claim 4.

6. In conjunction with a processor that normally resolves virtual memory page addresses by referencing a set of page tables, each page table having a plurality of page entries, wherein each page table entry is normally used for resolving a single virtual memory page address, a method comprising the following steps:

referring the processor to a single page table for resolving virtual memory page addresses, wherein the processor uses each page entry for resolving a plurality of different virtual memory page addresses;

when a particular address translation is needed by the processor to resolve a virtual memory page address, temporarily loading said particular address translation in a corresponding page entry in the single page table;

wherein the referring step comprises initializing at least one entry of a page table directory.

7. In conjunction with a processor that normally resolves virtual memory page addresses by referencing a set of page tables, each page table having a plurality of page entries, wherein each page table entry is normally used for resolving a single virtual memory page address, a method comprising the following steps:

referring the processor to a single page table for resolving virtual memory page addresses, wherein the processor uses each page entry for resolving a plurality of different virtual memory page addresses;

when a particular address translation is needed by the processor to resolve a virtual memory page address, temporarily loading said particular address translation in a corresponding page entry in the single page table;

invalidating said corresponding page entry after it is used by the processor to resolve said virtual memory address.

8. In conjunction with a processor having an address translation cache that is updated by referencing a page table directory and a plurality of associated page tables referenced by the page table directory, wherein each page table entry normally stores a single address translation corresponding to a single virtual page address, a method comprising the following steps:

configuring the page table directory and a single page table to generate a memory fault when the processor attempts to update its address translation cache;

configuring entries of the page table directory to reference the single page table, wherein the processor references a particular entry of said single page table to obtain address translations for a plurality of different virtual page addresses;

temporarily validating said particular entry of said single page table in response to a first memory fault generated when the processor attempts to obtain an address translation corresponding to one of said plurality of different virtual page addresses;

invalidating said particular entry after the processor obtains the address translation corresponding to said one of said plurality of different virtual page addresses;

wherein the invalidating step is performed in response to a second memory fault that is subsequent to the first memory fault.

9. A computer-readable storage medium having instructions for configuring the processor to perform the steps of claim 8.

10. In conjunction with a processor having an address translation cache that is updated by referencing a page table directory and a plurality of associated page tables referenced by the page table directory, wherein each page table entry normally stores a single address translation corresponding to a single virtual page address, a method comprising the following steps:

configuring the page table directory and a single page table to generate a memory fault when the processor attempts to update its address translation cache;

configuring entries of the page table directory to reference the single page table, wherein the processor references a particular entry of said single page table to obtain address translations for a plurality of different virtual page addresses;

temporarily validating said particular entry of said single page table in response to a first memory fault generated when the processor attempts to obtain an address translation corresponding to one of said plurality of different virtual page addresses;

invalidating said particular entry after the processor obtains the address translation corresponding to said one of said plurality of different virtual page addresses;

wherein the invalidating step is performed without flushing the address translation cache.

11. In conjunction with a processor having an address translation cache that is updated by referencing a page table directory and a plurality of associated page tables referenced by the page table directory wherein each page table entry normally stores a single address translation corresponding to a single virtual page address, a method comprising the following steps:

configuring the page table directory and a single page table to generate a memory fault when the processor attempts to update its address translation cache;

configuring entries of the page table directory to reference the single page table, wherein the processor references a particular entry of said single page table to obtain address translations for a plurality of different virtual page addresses;

temporarily validating said particular entry of said single page table in response to a first memory fault generated when the processor attempts to obtain an address translation corresponding to one of said plurality of different virtual page addresses;

invalidating said particular entry after the processor obtains the address translation corresponding to said one of said plurality of different virtual page addresses;

using a first set of one or more address translation caches for user code and data addresses and a second set of one or more address translation caches for operating system code and data addresses.

12. In conjunction with a processor having an address translation cache that is updated by referencing a page table directory and a plurality of associated page tables referenced by the page table directory, wherein each page table entry normally stores a single address translation corresponding to a single virtual page address, a method comprising the following steps:

configuring the page table directory and a single page table to generate a memory fault when the processor attempts to update its address translation cache;

configuring entries of the page table directory to reference the single page table, wherein the processor references a particular entry of said single page table to obtain address translations for a plurality of different virtual page addresses;

temporarily validating said particular entry of said single page table in response to a first memory fault generated when the processor attempts to obtain an address translation corresponding to one of said plurality of different virtual page addresses;

invalidating said particular entry after the processor obtains the address translation corresponding to said one of said plurality of different virtual page addresses;

wherein the data processor has one or more associative address translation caches that are large enough to store all the address translations required by the is data processor during execution of a single instruction.

13. In conjunction with a processor having an address translation cache that is updated by referencing a page table directory and a plurality of associated page tables referenced by the page table directory wherein each page table entry normally stores a single address translation corresponding to a single virtual page address, a method comprising the following steps:

configuring the page table directory and a single page table to generate a memory fault when the processor attempts to update its address translation cache;

configuring entries of the page table directory to reference the single page table, wherein the processor references a particular entry of said single page table to obtain address translations for a plurality of different virtual page addresses;

temporarily validating said particular entry of said single page table in response to a first memory fault generated when the processor attempts to obtain an address translation corresponding to one of said plurality of different virtual page addresses;

invalidating said particular entry after the processor obtains the address translation corresponding to said one of said plurality of different virtual page addresses;

simultaneously caching all address translations required for a single processor instruction in one or more address translation caches.

14. In conjunction with a processor having an address translation cache that is updated by referencing a page table directory and a plurality of associated page tables referenced by the page table directory wherein each page table entry normally stores a single address translation corresponding to a single virtual page address, a method comprising the following steps:

configuring the page table directory and a single page table to generate a memory fault when the processor attempts to update its address translation cache;

configuring entries of the page table directory to reference the single page table, wherein the processor references a particular entry of said single page table to obtain address translations for a plurality of different virtual page addresses;

temporarily validating said particular entry of said single page table in response to a first memory fault generated when the processor attempts to obtain an address translation corresponding to one of said plurality of different virtual page addresses;

invalidating said particular entry after the processor obtains the address translation corresponding to said one of said plurality of different virtual page addresses;

repeating the validating and invalidating steps for all the address translations required to execute a single processor instruction, wherein said address translations are simultaneously cached in one or more address translation caches.

15. In conjunction with a processor having an address translation cache that is updated by referencing a page table directory and a plurality of associated page tables referenced by the page table directory, wherein each page table entry normally stores a single address translation corresponding to a single virtual page address, a method comprising the following steps:

configuring the page table directory and a single page table to generate a memory fault when the processor attempts to update its address translation cache;

configuring entries of the page table directory to reference the single page table, wherein the processor references a particular entry of said single page table to obtain address translations for a plurality of different virtual page addresses;

temporarily validating said particular entry of said single page table in response to a first memory fault generated when the processor attempts to obtain an address translation corresponding to one of said plurality of different virtual page addresses;

invalidating said particular entry after the processor obtains the address translation corresponding to said one of said plurality of different virtual page addresses;

wherein the processor is of a type that uses a first address translation cache for small code pages, a second address translation cache for large code pages, a third address translation cache for small data pages, and a fourth address translation cache for large data pages;

positioning memory fault handler code in no more than two small code pages;

positioning memory fault handler data in one or more large data pages;

positioning system-managed data in one or more large data pages;

positioning user code and data in small code and data pages.

16. In conjunction with a processor having an address translation cache that is updated by referencing a page table directory and a plurality of associated page tables referenced by the page table directory wherein each page table entry normally stores a single address translation corresponding to a single virtual page address, a method comprising the following steps:

configuring the page table directory and a single page table to generate a memory fault when the processor attempts to update its address translation cache;

configuring entries of the page table directory to reference the single page table, wherein the processor references a particular entry of said single page table to obtain address translations for a plurality of different virtual page addresses;

temporarily validating said particular entry of said single page table in response to a first memory fault generated when the processor attempts to obtain an address translation corresponding to one of said plurality of different virtual page addresses;

invalidating said particular entry after the processor obtains the address translation corresponding to said one of said plurality of different virtual page addresses;

wherein the processor is of a type that uses a first address translation cache for small code pages, a second address translation cache for large code pages, a third address translation cache for small data pages, and a fourth address translation cache for large data pages;

positioning memory fault handler code in a large code page;

positioning memory fault handler data in one or more large data pages;

positioning system-managed data in one or more large data pages;

positioning user code and data in small code and data pages.

17. A computer-readable storage medium for use in conjunction with a processor having an address translation cache that is updated by referencing page tables, wherein each page table entry normally stores a single address translation, the computer-readable storage medium having instructions that are executable by the processor to perform steps comprising:

referring the processor to a single page table for obtaining address translations, and to a single entry within the single page table for obtaining a plurality of different address translations;

generating a first memory fault when the processor attempts to obtain a particular address translation in response to an address translation cache miss;

temporarily validating said single entry within the single page table with said particular address translation in response to said first memory fault;

invalidating said single entry after said first memory fault;

wherein the invalidating step is performed in response to a second memory fault that is subsequent to the first memory fault.

18. A computer-readable storage medium for use in conjunction with a processor having an address translation cache that is updated by referencing page tables, wherein each page table entry normally stores a single address translation the computer-readable storage medium having instructions that are executable by the processor to perform steps comprising:

referring the processor to a single page table for obtaining address translations, and to a single entry within the single page table for obtaining plurality of different address translations;

generating a first memory fault when the processor attempts to obtain a particular address translation in response to an address translation cache miss;

temporarily validating said single entry within the single page table with said particular address translation in response to said first memory fault;

invalidating said single entry after said first memory fault;

wherein the invalidating step is performed without flushing the address translation cache.

19. A computer-readable storage medium for use in conjunction with a processor having an address translation cache that is updated by referencing page tables, wherein each page table entry normally stores a single address translation, the computer-readable storage medium having instructions that are executable by the processor to perform steps comprising:

referring the processor to a single page table for obtaining address translations, and to a single entry within the single page table for obtaining a plurality of different address translations;

generating a first memory fault when the processor attempts to obtain a particular address translation in response to an address translation cache miss;

temporarily validating said single entry within the single page table with said particular address translation in response to said first memory fault;

invalidating said single entry after said first memory fault;

using a first set of one or more address translation caches for user code and data addresses and a second set of one or more address translation caches for operating system code and data addresses.

20. A computer-readable storage medium for use in conjunction with a processor having an address translation cache that is updated by referencing page tables, wherein each page table entry normally stores a single address translation, the computer-readable storage medium having instructions that are executable by the processor to perform steps comprising:

referring the processor to a single page table for obtaining address translations, and to a single entry within the single page table for obtaining a plurality of different address translations;

generating a first memory fault when the processor attempts to obtain a particular address translation in response to an address translation cache miss;

temporarily validating said single entry within the single page table with said particular address translation in response to said first memory fault;

invalidating said single entry after said first memory fault;

wherein the referring step comprises initializing at least one entry of a page table directory.

21. A computer system comprising:

a processor of a type having at least one address translation cache that is updated by referencing table entries that normally each store a single address translation;

at least a single table entry, the processor being configured to reference said single page table entry to obtain a plurality of different address translations;

a memory fault handler that temporarily loads a particular address translation in said single table entry in response to a first memory fault that is generated when the processor references said single table entry, wherein the processor obtains said particular address translation from said single table entry after said first memory fault;

wherein the memory fault handler marks as invalid said single table entry after the processor has obtained said address translation;

wherein said single table entry is initially marked as invalid to generate the first memory fault.

22. A computer system comprising:

a processor of a type having at least one address translation cache that is updated by referencing table entries that normally each store a single address translation;

at least a single table entry the processor being configured to reference said single page table entry to obtain a plurality of different address translations;

a memory fault handler that temporarily loads a particular address translation in said single table entry in response to a first memory fault that is generated when the processor references said single table entry wherein the processor obtains said particular address translation from said single table entry after said first memory fault;

wherein the memory fault handler marks as invalid said single table entry after the processor has obtained said address translation;

wherein the single table entry is initially marked as invalid to generate the first memory fault.

23. A computer system comprising:

a processor of a type having at least one address translation cache that is updated by referencing table entries that normally each store a single address translation;

at least a single table entry, the processor being configured to reference said single page table entry to obtain a plurality of different address translations;

a memory fault handler that temporarily loads a particular address translation in said single table entry in response to a first memory fault that is generated when the processor references said single table entry wherein the processor obtains said particular address translation from said single table entry after said first memory fault;

wherein the memory fault handler marks as invalid said single table entry after the processor has obtained said address translation;

wherein the memory fault handler does not flush the address translation cache when marking the single table entry as invalid.

24. A computer system comprising:
a processor of a type having at least one address translation cache that is updated by referencing table entries that normally each store a single address translation;
at least a single table entry the processor being configured to reference said single page table entry to obtain a plurality of different address translations;
a memory fault handler that temporarily loads a particular address translation in said single table entry in response to a first memory fault that is generated when the processor references said single table entry wherein the processor obtains said particular address translation from said single table entry after said first memory fault;
wherein the memory fault handler marks as invalid said single table entry after the processor has obtained said address translation;
a table having multiple table entries;
a table directory having multiple entries that are initialized to reference said single table.

25. A computer system comprising:
a processor of a type having at least one address translation cache that is normally updated by referencing a page table directory and a plurality of page tables referenced by the page table directory, wherein each page table entry normally stores a single address translation corresponding to a single virtual page address;
a page table directory and a single page table, the page table directory having a plurality of entries that reference the single page table, the page table entries being marked invalid to generate a memory fault when the processor attempts to update its address translation cache;
a memory fault handler that performs the following steps in response to a first memory fault that is generated when the processor attempts to obtain a particular address translation corresponding to a particular virtual page address;
marking as valid a particular page table directory entry that the processor references when attempting to obtain said particular address translation;
loading said particular address translation in an entry in the single page table that the processor references when attempting to obtain said address translation;
wherein the memory fault handler marks as invalid said particular page table directory entry after the processor has obtained said address translation;
wherein said at least one address translation cache includes a plurality of address translation caches, further comprising application code and operating system code that are configured to use different address translation caches, the memory fault handler being part of the operating system code.

26. A computer system comprising:
a processor of a type having at least one address translation cache that is normally updated by referencing a page table directory and a plurality of page tables referenced by the page table directory, wherein each page table entry normally stores a single address translation corresponding to a single virtual page address;
a page table directory and a single page table, the page table directory having a plurality of entries that reference the single page table, the page table entries being marked invalid to generate a memory fault when the processor attempts to update its address translation cache;
a memory fault handler that performs the following steps in response to a first memory fault that is generated when the processor attempts to obtain a particular address translation corresponding to a particular virtual page address:
marking as valid a particular page table directory entry that the processor references when attempting to obtain said particular address translation;
loading said particular address translation in an entry in the single page table that the processor references when attempting to obtain said address translation;
wherein the memory fault handler marks as invalid said particular page table directory entry after the processor has obtained said address translation;
wherein the memory fault handler marks said particular page table directory as invalid in response to a second memory fault that is generated subsequent to the first memory fault.

27. A computer system comprising:
a processor of a type having at least one address translation cache that is normally updated by referencing a page table directory and a plurality of page tables referenced by the page table directory, wherein each page table entry normally stores a single address translation corresponding to a single virtual page address;
a page table directory and a single page table, the page table directory having a plurality of entries that reference the single page table, the page table entries being marked invalid to generate a memory fault when the processor attempts to update its address translation cache;
a memory fault handler that performs the following steps in response to a first memory fault that is generated when the processor attempts to obtain a particular address translation corresponding to a particular virtual page address:
marking as valid a particular page table directory entry that the processor references when attempting to obtain said particular address translation;
loading said particular address translation in an entry in the single page table that the processor references when attempting to obtain said address translation;
wherein the memory fault handler marks as invalid said particular page table directory entry after the processor has obtained said address translation;
wherein said at least one address translation cache includes a plurality of address translation caches that have enough capacity to simultaneously cache all the address translations required for a single processor instruction.

28. A computer system comprising:
a processor of a type having at least one address translation cache that is normally updated by referencing a page table directory and a plurality of page tables referenced by the page table directory, wherein each page table entry normally stores a single address translation corresponding to a single virtual page address;
a page table directory and a single page table, the page table directory having a plurality of entries that reference the single page table, the page table entries being marked invalid to generate a memory fault when the processor attempts to update its address translation cache;
a memory fault handler that performs the following steps in response to a first memory fault that is generated when the processor attempts to obtain a particular address translation corresponding to a particular virtual page address:
marking as valid a particular page table directory entry that the processor references when attempting to obtain said particular address translation;
loading said particular address translation in an entry in the single page table that the processor references when attempting to obtain said address translation;
wherein the memory fault handler marks as invalid said particular page table directory entry after the processor has obtained said address translation;
wherein said at least one address translation cache has enough capacity to simultaneously cache all the address translations required for a single processor instruction, and wherein the memory fault handler is configured so that it does not displace said address translations from said at least one address translation cache during execution of said instruction.

29. A computer system comprising:
a processor of a type having at least one address translation cache that is updated by referencing table entries that normally each store a single address translation;
at least a single table entry, the processor being configured to reference said single page table entry to obtain a plurality of different address translations;
a memory fault handler that temporarily loads a particular address translation in said single table entry in response to a first memory fault that is generated when the processor references said single table entry, wherein the processor obtains said particular address translation from said single table entry after said first memory fault;
wherein the memory fault handler marks as invalid said single table entry after the processor has obtained said address translation: and
wherein the memory fault handler subsequently temporarily loads other address translations in said single table entry in response to subsequent memory faults, wherein the processor obtains said other address translations from said single table entry after said subsequent memory faults.

30. In conjunction with a processor that is configured to obtain virtual memory address translations by referencing table entries that normally each store a single address translation, a method comprising the following steps:
configuring the processor to reference a single table entry to obtain a plurality of different address translations;
generating a first memory fault when the processor attempts to reference said single table entry;
temporarily loading a particular address translation in said single table entry in response to said first memory fault, wherein the processor obtains said particular address translation from said single table entry after said first memory fault;
marking as invalid said single table entry after the processor has obtained said address translation; and
temporarily loading other address translations in said single table entry in response to subsequent memory faults, wherein the processor obtains said other address translations from said single table entry after said subsequent memory faults.

* * * * *